United States Patent [19]

Katayama

[11] 4,354,399
[45] Oct. 19, 1982

[54] HANDLE BAR FIXING DEVICE FOR A BICYCLE

[75] Inventor: Hitoshi Katayama, Sakai, Japan

[73] Assignee: Shimano Industrial Company Limited, Osaka, Japan

[21] Appl. No.: 91,366

[22] Filed: Nov. 5, 1979

[30] Foreign Application Priority Data

Nov. 29, 1978 [JP] Japan .......................... 53-164931[U]
Nov. 29, 1978 [JP] Japan .......................... 53-164932[U]

[51] Int. Cl.³ ............................................ B62K 21/12
[52] U.S. Cl. .................................. 74/551.1; 74/551.3; 403/104; 403/373; 403/47
[58] Field of Search ................ 74/551.3, 551.1, 551.5, 74/551.6; 403/104, 374, 373, 362, 366, 47; 24/249 LS; 411/384

[56] References Cited

U.S. PATENT DOCUMENTS

| 1,160,932 | 11/1915 | Mendelson | 403/362 |
| 1,220,648 | 3/1917 | Leader | 403/362 |
| 1,588,128 | 6/1926 | Montgomery | 403/47 |
| 2,273,102 | 2/1942 | Harris et al. | 403/373 |

FOREIGN PATENT DOCUMENTS

| 393911 | 4/1924 | Fed. Rep. of Germany | 75/551.3 |
| 426224 | 4/1911 | France | 403/374 |
| 925872 | 9/1947 | France |  |
| 2420474 | 10/1979 | France |  |
| 253155 | 2/1948 | Switzerland | 74/551.1 |

Primary Examiner—Kenneth J. Dorner
Attorney, Agent, or Firm—Stevens, Davis, Miller & Mosher

[57] ABSTRACT

A handle bar fixing device for a bicycle, which is used to fix a handle bar to a cylindrical holding portion attached to the utmost end of a lug provided at a handle stem. At the lug is provided a through bore which extends lengthwise of the lug, opens at one end into the holding portion and at the other end onto the stem body, and has a screw thread in part. A control member with two first and second screw threads different in pitch angle and in the direction of screw, is screwed with the through bore by way of the first screw thread. A pusher having a screw member screwable with the second screw thread is supported axially movably only to a first end portion of the through bore opening into the holding portion. The control member is rotated to force the pusher to move lengthwise of the lug so that the handle bar inserted through the holding portion may be fixed thereto.

5 Claims, 6 Drawing Figures

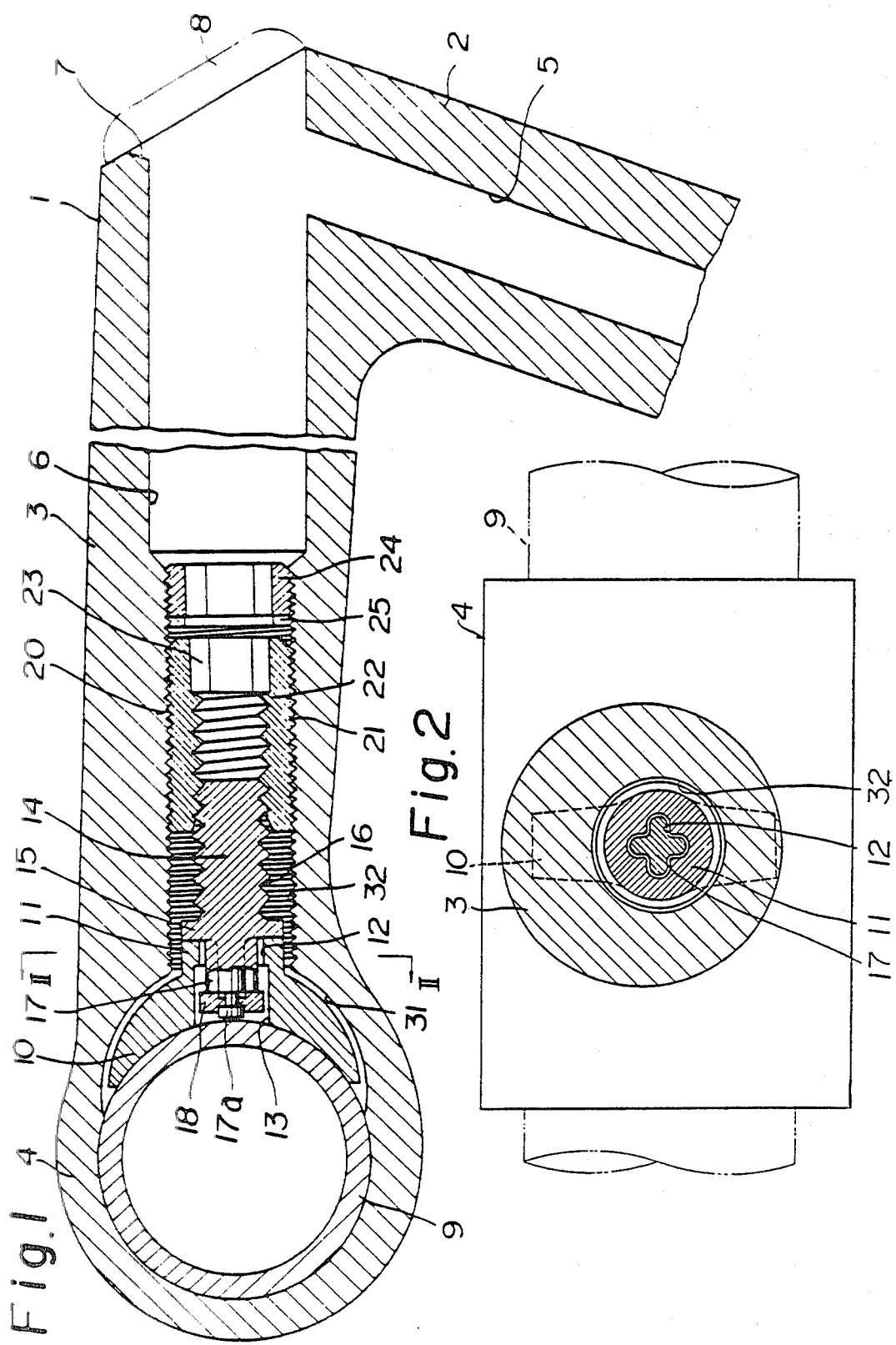

HANDLE BAR FIXING DEVICE FOR A BICYCLE

BACKGROUND AND SUMMARY OF THE INVENTION

This invention relates to a handle bar fixing device for a bicycle, and more particularly to a handle bar fixing device for a bicycle, which is used for fixing the handle bar to a handle stem.

Generally, the handle stem has at its top a lug extending radially of the stem, the lug having at its utmost end a cylindrical holding portion, in which the handle bar is inserted to be fixed through a fixing device.

The conventional fixing device for the handle bar, as shown in FIG. 4, is so constructed that a cylindrical handle-bar-holding portion a provided at the utmost end of a lug e extending from the handle stem is cut at one side and the opposite cut ends have a pair of flanges b extending radially of the holding portion a, and a bolt c is inserted into the flanges b and tightened to contract the holding portion a in diameter, whereby the handle bar d inserted into the holding portion a is fixed thereto.

Another conventional fixing device, as shown in FIG. 5, is so constructed that the lug e of the handle stem is provided with a chamber f opening into an insertion bore at the holding portion a and housing a pusher h and a cam i, the pusher h having at its one side a cam face g, so that the cam i is screwably moved by a bolt j inserted from the outside of lug e to thereby move the pusher h toward the axis of holding portion a to fix the handle bar d thereto.

Both conventional fixing devices, which have the flanges b or bolt j projecting outwardly, are not desirable from the viewpoint of appearance and safety. Also, the bolt c or j located as shown is not easily turned for control.

Furthermore, the bolts c and j are exposed outward and to the weather which frequently causes them to rust, resulting in difficulty of removing the handle bar for exchange. Especially, in the device shown in FIG. 5, the bolt j, even when not rusted, is screwed to allow the cam i to jam the cam face g, which causes difficulty in unscrewing the bolt j. Also, even when the bolt j is unscrewed to move the cam i backward, the pusher h is not associated with the cam i in the direction of backward movement thereof, and continues to push against the handle bar, resulting in a difficult removal of the handle bar.

In order to overcome the aforesaid problems, this invention has been designed. A main object of the invention is to provide a handle bar fixing device which is simple in construction and capable of being assembled entirely into the handle stem to have a simple appearance. Another object is to ensure a good operation for fixing a handle bar.

Another object of the invention is to provide a handle bar fixing device capable of simply and reliably releasing the fixed handle bar to thereby facilitate removal thereof.

In detail, the handle bar fixing device of the invention is used to fix the handle bar to a cylindrical holding portion provided at the utmost end of a lug extending from the handle stem. At the lug is provided a through bore which extends lengthwise of the lug, opens at one end into the holding portion and at the other end onto one side of the stem body, and has a screw thread in part. A control member having first and second screw threads different in pitch angle and in the direction of screw, is screwed with the through bore by way of the first screw thread. A pusher having a screw member screwable with the second screw thread is supported axially movably only to a first end portion of the through bore opening into the holding portion. The control member is rotated to force the pusher to move lengthwise of the lug, whereby the handle bar inserted into the holding portion is fixed thereto.

In other words, the second screw thread at the control member, which is screwable with the screw member at the pusher, is made larger in pitch angle than the first screw thread screwable with the screw thread at the through bore. When the control member is rotated to screw forward through the first screw thread, a difference is created between screwably moved distances of the control member and the screw member screwing forward together therewith, thereby forcing the pusher to move toward the axis of the holding portion, or the first and second screw threads are made different in the direction of screw, so that the control member is rotated to screw toward the handle stem, while the screw member screws toward the holding member, whereby the pusher is forcibly moved toward the axis of the holding portion. Hence, the thrust of the screw thread is used to ensure fixing of the handle bar to the holding portion and also easy release therefrom.

These and other objects and novel features of the invention will be more apparent from the detailed description and examples which follow.

BRIEF DESCRIPTION OF THE DRAWINGS

FIG. 1 is a longitudinal sectional view of an embodiment of a handle bar fixing device of the invention, FIG. 2 is a sectional view taken on the line II—II in FIG. 1.

DETAILED DESCRIPTION OF THE INVENTION

Figure 3:
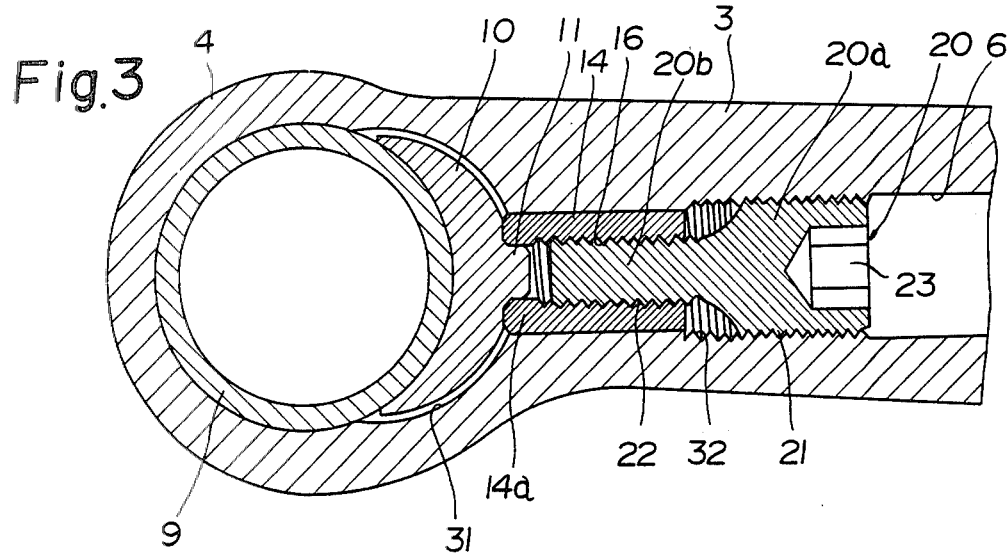
FIG. 3 is a sectional view of a modified embodiment, showing a principal portion thereof only.
Figure 4:
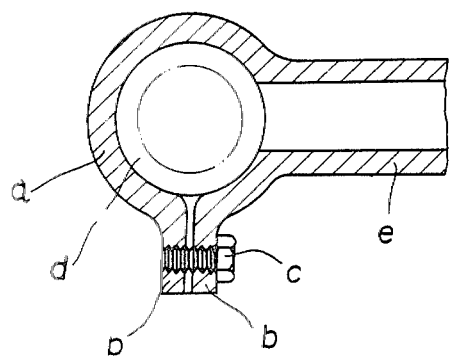
FIGS. 4 and 5 are sectional views of conventional handle bar fixing devices, showing principal portions thereof only.
Figure 5:
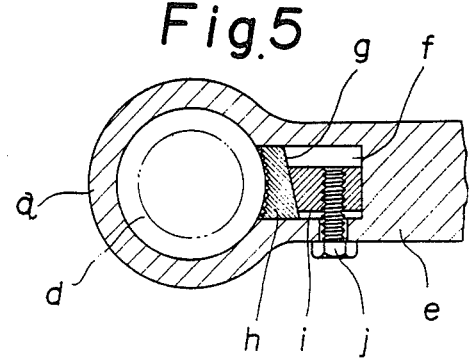

Referring to FIG. 1, reference numeral 1 designates a handle stem applied with the handle bar fixing device of the invention. The handle stem 1 includes a lug 3 extending from one side of the top of a vertical stem body 2 integrally therewith. A cylindrical holding portion 4 for fixing a handle bar 9 is provided at the utmost end of the lug 3 integrally therewith.

The stem body 2 has therein a through bore 5 extending from the top to the bottom of the body, and the lug 3 has therein a through bore 6 extending lengthwise thereof and opening at one end into the holding portion 4 and at the other end onto one side of the top of the stem body 2.

The through bores 5 and 6 intersect at the top of the stem body 2 to form an opening 7. The opening 7 is covered by a cap 8 for preventing an entry of rain water into the bores 5 and 6.

In addition, the stem body 2 is fixed at its lower portion to a front fork of the bicycle by a well-known fixing means. The handle bar 9 is inserted into and fixed to the holding portion 4 by a fixing device to be hereinafter described.

Next, the fixing device shown in FIG. 1 will be described.

Reference numeral 10 designates a pusher which contacts with the handle bar 9 inserted into the holding portion 4 and urges the handle bar 9 radially of the holding portion 4. The pusher 10 is accommodated not-rotatably into a groove 31 which is formed at a first end portion of the through bore 6 opening within the lug 3, the groove 31 being in continuation of the bore 6 and opening at the inner periphery of the holding portion 4.

The pusher 10 also comprises a portion having a concaved surface of curvature nearly equal to that of the outer periphery of handle bar 9 and a boss 11 extending from the center of the portion having the concaved surface to project into the through bore 6 as shown in FIG. 1. The boss 11, as shown in FIG. 2, has at its center a bore 12 of a cross-shape in section, the bore 12 perforating the boss 11 axially thereof and communicating with a through bore 13 opening at the center of the concaved surface.

The pusher 10, when accommodated in the groove 31, is freely movable toward the axis of holding portion 4, but not-rotatable.

Furthermore, the pusher 10 carries a screw member 14 which is formed of a solid rod. The screw member 14 is provided at the outer periphery thereof with a screw thread 16, at one lengthwise end with a flange 15 equal in diameter to the boss 11 of the pusher 10, and at one side, i.e., the left side in FIG. 1, of the flange 15 with a stem 17 of a cross-shape in section and engageable with the bore 12 at the boss 11.

At the utmost end of stem 17 is a smaller diameter stem 17a. The stem 17 is fit into the through bore 12, and the smaller diameter stem 17a is placed within the through bore 13, and a lock 18, such as a C-like shaped ring, of a larger outer diameter than the diameter of through bore 12, is fit onto the smaller diameter shaft 17a, thereby mounting the screw member 14 to the pusher 10. Hence, the screw member 14, when engaging with the pusher 10, is not-rotatable. In addition, the screw member 14, other than being formed separately from the pusher 10, may be formed integrally therewith.

The through bore 12 at the boss 11 of pusher 10 and the stem 17 at the screw member 14 may alternatively be elliptical or square-shaped.

A partial screw thread 32 of a given axial length is provided at the inner periphery of the through bore 6 at a side of the holding portion 4 and screwed with a control member 20.

The control member 20 is cylindrical and is provided at the outer periphery thereof with a first screw thread 21 screwable with the screw thread 32 provided at the through bore 6, at the inner periphery with a second screw thread 22 screwable with the screw thread 16 at the screw member 14, and at the axially outward end (at the right hand in FIG. 1) with a control recess 23 of a hexagonal shape, through which the control member 20 is controllable from the second end of through bore 6 opening at the top of the handle stem 1. Also, the control member 20 is screwed at its second screw thread 22 with the screw thread 16 at the screw member 14, and then is screwed at the first screw thread 21 with the partial screw thread 32 at the through bore 6, thereby being assembled into the lug 3. The first and second screw threads 21 and 22 are screwed in the same direction and different in pitch angle such that the second screw thread 22 is larger in pitch angle than the first screw thread 21, thereby forming the so-called differential screw.

Hence, the control member 20, when rotated, screws toward the holding portion 4, i.e., leftwardly in FIG. 1, through the first screw thread 21 screwed with the partial screw thread 32, and simultaneously, the screw member 14 screws leftwardly through its screw thread 16 screwed with the second screw thread 22 at the control member 20. In this instance, a screwably moved distance of the screw member 14 is larger than that of the control member 20, so that the screw member 14 moves ahead of the control member 20 toward the holding portion 4 to an extent of the difference between the above moved distances. The screw member 14 moves to allow the flanges 15 to push the boss 11 of the pusher 10 and the pusher 10 moves toward the axis of the holding portion 4, whereby the handle bar 9 inserted into the holding portion 4 is biased by the pusher 10 to the inner periphery of holding portion 4 and fixed thereto. Incidentally, the control member 20 is rotated by a jig, such as a hexagonal wrench, inserted through the second end of through bore 6 and fit into the control recess 23 at the control member 20.

On the other hand, the handle bar 9 is released by rotating the control member 20 in the reverse direction.

In other words, when the control member 20 is rotated in the reverse direction, the screw member 14 moves to force the pusher 10 to be released from its press-contact with the handle bar 9 due to the fact that the screwably moved distance of the screw member 14 is larger than that of the control member 20 to thereby allow the screw member 14 to move with respect to the control member 20 in a difference between the moved distances. Therefore, the pusher 10, even when jammed to the handle bar 9, can be released therefrom with small strength thanks to the thrust of the screw thread caused by rotation of the control member 20.

In addition, in FIG. 1, reference numeral 24 designates a lock nut fit into the outward end of inner screw thread at the through bore 6, and reference numeral 25 designates a washer inserted axially inwardly of the nut 24.

The aforesaid control member 20 may alternatively be formed of a stepped rod comprising larger and smaller diameter portions 20a and 20b, the larger diameter portion 20a having a first screw thread 21 and the smaller diameter portion 20b having a second screw thread 22. The screw member 14 may be made cylindrical to have at its inner periphery a screw thread 16 screwable with the second screw thread 22 as shown in FIG. 3.

In this instance, the boss 11 of the pusher 10 is square-shaped in cross section, and the one end 14a of the screw member 14 is square-shaped to be fit onto the boss 11 to thereby keep the screw member 14 not-rotatable. Preferably, the screw member 14 is integrated with the boss 11.

In the embodiment shown in FIG. 3, the first screw thread 21 and second screw thread 22 are, similarly to the former embodiment, screwed in the same direction and the second screw thread 22 is larger in pitch angle than the first screw thread 21. Also, the control member 20 and the first end portion of the lug 3 may be square-shaped in cross section and they are fitted to each other to prevent rotation of the control member 20.

Figure 6:
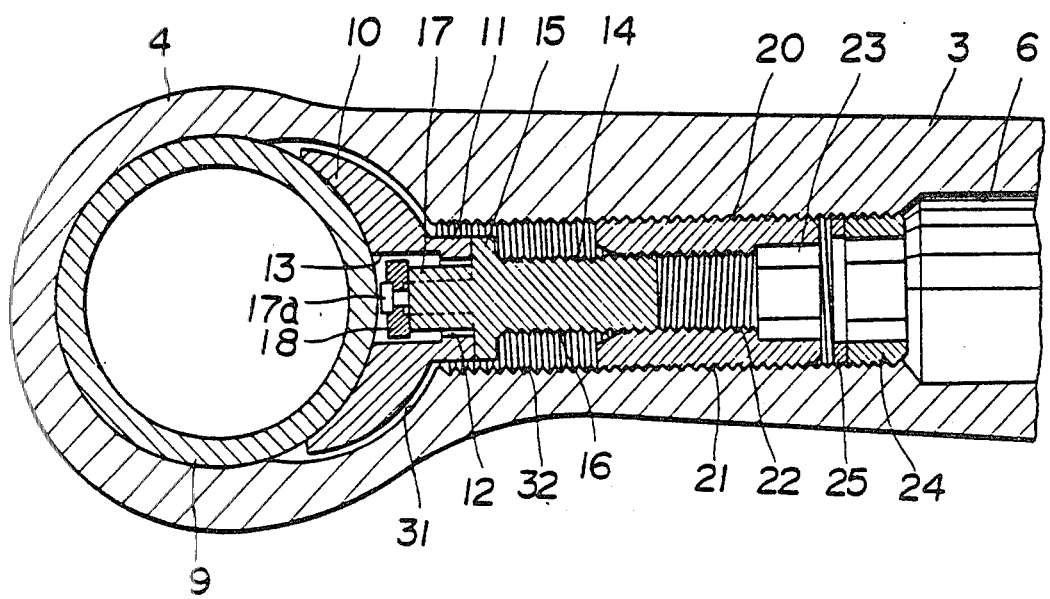
FIG. 6 is a sectional view of another embodiment of the invention.

The two aforesaid embodiments have the first and second screw threads 21 and 22 in the same direction of screw and different in pitch angle, but both the threads may be screwed in the reverse direction, as shown in FIG. 6, where both threads may be equal or different in pitch angle.

As clearly understood from the aforesaid description, the handle bar fixing device of the invention is so constructed that the control member is provided with first and second screw threads, the first screw thread screwing with the thread at the through bore of the lug at the top of the handle stem, the second screw thread screwing with the screw member mounted to the pusher for biasing the handle bar, and the first and second screw threads are different in pitch angle or the direction of screw, so that the control member is rotated to force the pusher to reciprocate axially. Hence, the pusher can press on the handle bar to be held tight to the holding portion, and rotation of the control member ensures simple operation for fixing the handle bar. Also, the fixed handle bar can be released forcibly by the pusher integrated with the screw member.

Furthermore, the fixing device of the invention, which is housed within the lug of the handle stem, has no screw exposed, resulting in a good appearance and less rust.

While the preferred embodiment of the invention has been described using specific terms, such description is for illustrative purpose only, and it is to be understood that changes and variations may be made without departing from the spirit or scope of the invention as defined in the following claims.

What is claimed is:

1. A handle bar fixing device for fixing a handle bar to a handle stem of a bicycle comprising: a handle stem having a lug and a cylindrical holding portion provided at an utmost end of said lug for holding a handle bar, said lug having a through bore, said through bore opening at one end thereof onto an inner periphery of said holding portion and at another end onto a top of said handle stem, and having at its inner periphery a partial screw thread, said lug supporting, through a control member mounted therein, a pusher at a first end portion of said through bore opening into said holding portion in a manner permitting said pusher to be non-rotatable movable axially of said lug, said pusher contacting with a handle bar inserted into said holding portion for urging said handle bar radially of said holding portion, and carrying a screw member, said control member being housed within said through bore at said lug and having a first screw thread screwable with said partial screw thread at the through bore, a second screw thread screwable with said screw member, and a control recess through which said control member is rotatable from a second end portion of said through bore opening onto said top of said handle stem, said control member being supported to said lug through said first screw thread screwing with said screw thread at the through bore, so that said control member is rotatably controlled through said control recess to move said screw member axially of said lug, whereby said pusher moves to fix said handle bar to said holding portion.

2. A handle bar fixing device according to claim 1, wherein the first and second screw threads at said control member are screwed in the same direction and the second screw thread is larger in pitch angle than the first screw thread.

3. A handle bar fixing device according to claim 1, wherein the first and second screw threads at said control member are screwed in the reverse direction.

4. A handle bar fixing device according to claim 1, wherein said control member is cylindrical and is provided at an outer periphery thereof with the first screw thread and at an inner periphery thereof with the second screw thread, and said screw member screwable with said second screw thread is formed of a solid rod and is provided at its outer periphery with a screw thread.

5. A handle bar fixing device according to claim 1, wherein said control member comprises a stepped rod having a larger diameter portion and a smaller diameter portion, the larger diameter portion being provided with said first screw thread and the smaller diameter portion being provided with said second screw thread, and said screw member, screwable with said second screw thread, is formed as a cylindrical body having a round inner periphery at which is provided a screw thread which engages with said second screw thread.

* * * * *